US007070758B2

(12) United States Patent
Peterson

(10) Patent No.: US 7,070,758 B2
(45) Date of Patent: Jul. 4, 2006

(54) PROCESS AND APPARATUS FOR GENERATING HYDROGEN FROM OIL SHALE

(76) Inventor: Oren V. Peterson, 1250 W. 2600 North, Pleasant Grove, UT (US) 84062

( * ) Notice: Subject to any disclaimer, the term of this patent is extended or adjusted under 35 U.S.C. 154(b) by 144 days.

(21) Appl. No.: 10/623,074

(22) Filed: Jul. 18, 2003

(65) Prior Publication Data

US 2004/0126316 A1    Jul. 1, 2004

Related U.S. Application Data

(63) Continuation-in-part of application No. 10/409,022, filed on Apr. 8, 2003, now abandoned, which is a continuation-in-part of application No. 10/269,924, filed on Oct. 11, 2002, now abandoned, which is a continuation of application No. 09/610,842, filed on Jul. 5, 2000, now Pat. No. 6,464,860.

(60) Provisional application No. 60/428,609, filed on Nov. 22, 2002.

(51) Int. Cl.
*C01B 3/02* (2006.01)
*C01B 3/24* (2006.01)

(52) U.S. Cl. .................. 423/648.1; 208/400; 208/427; 423/418.2; 423/437.2; 423/650; 423/651; 423/658

(58) Field of Classification Search ............. 423/648.1, 423/650, 651, 658, 418.2, 437.2; 208/400, 208/427

See application file for complete search history.

(56) References Cited

U.S. PATENT DOCUMENTS

| 2,128,262 | A |  | 8/1938  | Newman |
| 2,664,389 | A |  | 12/1953 | Rex et al. |
| 3,503,868 | A |  | 3/1970  | Shields |
| 3,652,447 | A |  | 3/1972  | Yant |
| 3,803,025 | A |  | 4/1974  | Dailey |
| 3,928,550 | A |  | 12/1975 | Seitzer |
| 3,941,423 | A |  | 3/1976  | Garte |
| 3,950,486 | A |  | 4/1976  | Cardwell et al. |
| 3,954,938 | A |  | 5/1976  | Meissner |
| 4,028,222 | A |  | 6/1977  | Prull |
| 4,040,976 | A |  | 8/1977  | Greene |
| 4,206,038 | A | * | 6/1980  | Smith et al. ................ 208/113 |
| 4,216,199 | A |  | 8/1980  | Erickson |
| 4,300,997 | A |  | 11/1981 | Meguerian et al. |
| 4,304,656 | A |  | 12/1981 | Lee |
| 4,310,503 | A |  | 1/1982  | Erickson |
| 4,357,231 | A |  | 11/1982 | Estes et al. |
| 4,371,500 | A |  | 2/1983  | Papineau |
| 4,420,332 | A | * | 12/1983 | Mori et al. ................... 75/449 |

(Continued)

*Primary Examiner*—Wayne A. Langel
(74) *Attorney, Agent, or Firm*—Clayton, Howarth & Cannon, P.C.

(57) ABSTRACT

A process and apparatus for generating hydrogen from oil shale. Crushed oil shale may be placed in a chamber and combusted with carbon monoxide, oxygen and steam to form a gas stream of hydrogen and carbon monoxide. The hydrogen and carbon monoxide stream may be passed through a mechanism to produce hydrogen. In one embodiment, the hydrogen and carbon monoxide stream may be passed through a catalytic converter to produce hydrogen and carbon dioxide. The hydrogen and carbon dioxide may be cooled further and passed through a scrubber to remove the carbon dioxide such that hydrogen is produced. In another embodiment, the hydrogen and carbon monoxide may be passed through fluidized beds of magnetite to produce metallic iron, carbon dioxide and water. The metallic iron may then be conveyed to another chamber, where it may be treated with steam, producing magnetite and hydrogen.

93 Claims, 3 Drawing Sheets

U.S. PATENT DOCUMENTS

| | | |
|---|---|---|
| 4,480,559 A | 11/1984 | Blaskowski |
| 4,490,349 A | 12/1984 | Horvath |
| 4,505,809 A | 3/1985 | Brunner et al. |
| 4,536,278 A | 8/1985 | Tatterson et al. |
| 4,544,477 A | 10/1985 | Taylor |
| 4,545,622 A | 10/1985 | Yang |
| 4,548,702 A | 10/1985 | York et al. |
| 4,552,750 A | 11/1985 | van der Wal et al. |
| 4,560,547 A * | 12/1985 | Schora et al. ............... 423/650 |
| 4,587,011 A | 5/1986 | Okamoto et al. |
| 4,670,104 A | 6/1987 | Taylor |
| 4,696,680 A | 9/1987 | Ghate et al. |
| 4,858,689 A | 8/1989 | Logan |
| 4,865,625 A | 9/1989 | Mudge et al. |
| 4,872,886 A | 10/1989 | Henley et al. |
| 4,994,175 A | 2/1991 | Hargreaves et al. |
| 5,000,925 A | 3/1991 | Krishnamurthy et al. |
| 5,009,770 A | 4/1991 | Miller et al. |
| 5,265,410 A | 11/1993 | Hisatome |
| 5,287,926 A | 2/1994 | Gruppin |
| 5,349,810 A | 9/1994 | Landälv |
| 5,789,024 A | 8/1998 | Levy et al. |
| 5,821,396 A | 10/1998 | Bouziane |
| 5,900,224 A * | 5/1999 | Fujimura et al. ............ 423/359 |
| 5,980,858 A * | 11/1999 | Fujimura et al. ............ 423/655 |
| 6,024,774 A | 2/2000 | Nakagawa et al. |
| 6,079,212 A | 6/2000 | Tatani et al. |
| 6,141,796 A | 11/2000 | Cummings |
| 6,149,859 A | 11/2000 | Jahnke et al. |
| 6,167,691 B1 | 1/2001 | Yoshikawa et al. |
| 6,199,368 B1 | 3/2001 | Onoda et al. |
| 6,468,480 B1 | 10/2002 | Clawson et al. |

\* cited by examiner

PROCESS AND APPARATUS FOR GENERATING HYDROGEN FROM OIL SHALE

CROSS-REFERENCE TO RELATED APPLICATIONS

This application is a continuation in part of co-pending U.S. patent application Ser. No. 10/409,022 filed Apr. 7, 2003, now abandoned entitled "Process and Apparatus for Generating Hydrogen from Oil Shale," which is a continuation in part of U.S. patent application Ser. No. 10/269,924 filed Oct. 11, 2002, now abandoned entitled "Process and Apparatus for Regenerating Carbon Monoxide and Extracting Oil from Oil Shale," which is a continuation of U.S. patent application Ser. No. 09/610,842, filed Jul. 5, 2000, now U.S. Pat. No. 6,464,860, entitled "Process and Apparatus for Generating Carbon Monoxide and Extracting Oil from Oil Shale;" this application also claims the benefit of U.S. Provisional Application No. 60/428,609, filed Nov. 22, 2002, entitled "Process and Apparatus for Generating Hydrogen From Oil Shale," which applications are hereby incorporated by reference herein in their entireties, including but not limited to those portions that specifically appear hereinafter, the incorporation by reference being made with the following exception: In the event that any portion of the above-referenced applications are inconsistent with this application, this application supercedes said above-referenced applications.

STATEMENT REGARDING FEDERALLY SPONSORED RESEARCH OR DEVELOPMENT

Not Applicable.

BACKGROUND OF THE INVENTION

1. The Field of the Invention

The present invention relates generally to hydrogen production, and more particularly, but not necessarily entirely, to a process and apparatus for producing hydrogen from oil shale.

2. Description of Related Art

The concept of releasing oil from oil shale is well known. "Oil shale" is a naturally occurring sedimentary rock, typically a black or dark brown shale or silt-stone, that is rich in petroleum hydrocarbons, and other materials generally associated with the definition of the broad term "petroleum," "kerogen" or "bitumen," from which shale oil can be obtained. The shale oil is produced from the petroleum hydrocarbons, and released from the shale, through pyrolysis, which refers to the subjection of the oil shale to very high temperatures. The petroleum hydrocarbons are released initially in gaseous form. After being cooled they are bituminous-like in form, as they will not flow unless heated to about 400 degrees or more.

Producing commercial quantities of oil from oil shale remains cost prohibitive. The world continues to procure fuel oil by pumping crude oil from natural reserves, and refining the crude. Rapid increases in the price of crude oil, and the continued depletion of our natural oil reserves, may change that.

Large quantities of oil shale reside throughout the world. In the United States, substantial oil shale deposits are found in Colorado, Utah, Wyoming and Texas. The usual process of releasing oil from the oil shale, though it has been cost prohibitive from a commercial standpoint, comprises mining the shale, crushing it, and conducting pyrolysis by subjecting the crushed shale to heat at temperatures of 1000 degrees F.–1400 degrees F. The pyrolysis phase is conducted in the form of "destructive distillation," a process by which organic substances such as oil shale, wood or coal are decomposed by heat in the absence of air and distilled to produce useful products, in this case, oils. Other products such as coke, charcoal and gases are also the result of destructive distillation.

The liberation of oil from the oil shale by destructive distillation causes considerable coking of the oil shale residue, leaving behind a "retorted oil shale." The term "coking" refers to the production of coke, which is the solid residue of impure carbon obtained from carbonaceous materials such as oil shale, bituminous coal and the like, after removal of volatile material by destructive distillation.

The phrase "retorted oil shale," as used herein, is a form of coke, and refers to oil shale that has been subjected to destructive distillation to liberate the petroleum hydrocarbons, or oils, leaving an inorganic residue containing carbon. Therefore, the phrases "retorted oil shale," "carbon residue," and "carbon containing material," as used herein, are related in meaning, and as used herein, are interchangeable.

The phrase "spent oil shale," as used herein, refers to oil shale from which petroleum hydrocarbons and carbon have been removed.

The term "fluid," as used herein, shall refer broadly to both liquids and gases.

Attempts have been made in the prior art to improve upon the process of liberating oil from oil shale. Many such attempts are described in the following U.S. patents, which are incorporated herein by reference: U.S. Pat. No. 4,028,222 (granted Jun. 7, 1977 to Prull); U.S. Pat. No. 3,503,868 (granted Mar. 31, 1970 to Shields); U.S. Pat. No. 4,548,702 (granted Oct. 22, 1985 to York et al.); U.S. Pat. No. 4,536,278 (granted Aug. 20, 1985 to Tatterson et al.); U.S. Pat. No. 4,505,809 (granted Mar. 19, 1985 to Brunner et al.); U.S. Pat. No. 4,304,656 (granted Dec. 8, 1981 to Lee); U.S. Pat. No. 3,652,447 (granted Mar. 28, 1972 to Yant); U.S. Pat. No. 3,941,423 (granted Mar. 2, 1976 to Garte); and U.S. Pat. No. 4,357,231 (granted Nov. 2, 1982 to Estes et al.).

It is noteworthy that none of the prior art known to applicant provides an apparatus or method that optimizes the use of heat, and the reactants in the combustion cycle, in a more efficient manner. There is a long felt need for a destructive distillation process applicable to oil shale that is capable of (i) employing a recurring combustion/reaction cycle for a longer period of time by minimizing the presence of nonessential gases, (ii) recovering unused heat instead of permitting the heat to escape into atmosphere, and (iii) reusing and regenerating some of the reactants in the process.

Moreover, there is an increasing need for hydrogen for various uses such as in fuel cells. Fuel cells are electrochemical cells in which the energy of a reaction between a fuel, such as hydrogen, and an oxidant, such as oxygen, is converted directly and continuously into electrical energy. When hydrogen and oxygen react in a fuel cell, water is produced rather than the various pollutants that are generated in combustion of hydrocarbons.

Accordingly, fuel cells are increasingly being used for power generation in both stationary and transportation applications to take advantage of the environmental benefits of fuel cells. It would therefore be an advancement in the prior art to provide a process for extracting hydrogen from oil shale.

The prior art is thus characterized by several disadvantages, or long-felt needs, that are addressed by the present invention. The present invention minimizes, and in some aspects eliminates, the above-mentioned failures, and other problems, by utilizing the methods and structural features described herein.

BRIEF DESCRIPTION OF THE DRAWINGS

The features and advantages of the invention will become apparent from a consideration of the subsequent detailed description presented in connection with the accompanying drawings in which.

DETAILED DESCRIPTION OF THE INVENTION

Figure 1:
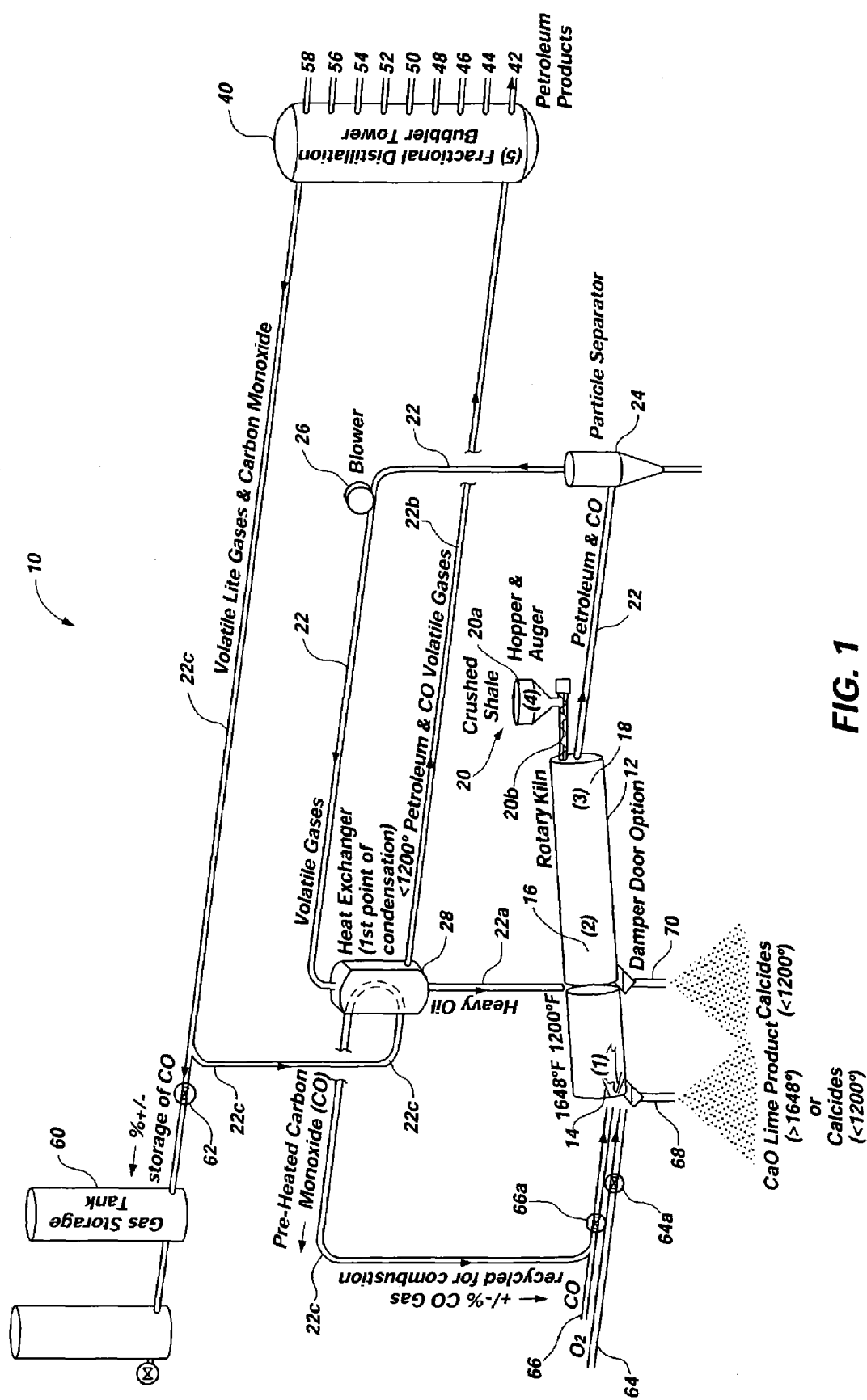
FIG. 1 is a schematic view of an apparatus for extracting oil from oil shale, made in accordance with the principles of the present invention.

For the purposes of promoting an understanding of the principles in accordance with the invention, reference will now be made to the embodiments illustrated in the drawings and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would normally occur to one skilled in the relevant art and having possession of this disclosure, are to be considered within the scope of the invention claimed.

Applicant has discovered that oil can be produced from oil shale more efficiently by using a relatively sealed combustion and reaction process, recovering and reusing heat, and by regenerating most, if not all, of the reactants in the combustion process. Furthermore, useable carbon monoxide can be produced or regenerated effectively, for use as a utility gas.

Referring now to FIG. 1, there is shown a schematic view of an apparatus for reducing oil shale into useable oil, carbon monoxide, calcites, and limes, the apparatus being designated generally at 10. The operation of the apparatus 10 will first be described briefly in terms of its key, basic features, after which more detail pertaining to those features will be provided.

The apparatus 10 includes a combustion chamber 12, which may also be referred to herein as a "combustion and regeneration chamber 12." The combustion chamber 12 is preferably a rotary kiln, such as a rotating pyrolysis drum retort, but may alternatively comprise any suitable retort such as a static mixer retort, a gravity flow retort, a fluid bed retort, a screw conveyor retort, or some other type of retort useable in accordance with the principles of the invention. The combustion chamber 12 preferably includes a combustion zone 14, a gas generation zone 16, and a destructive distillation zone 18.

A crushed shale source 20 preferably comprises a hopper 20a and an auger conveyor 20b, for transporting crushed oil shale from the hopper 20a into the destructive distillation zone 18 of the combustion chamber 12.

A movement path 22 is disposed in communication with the combustion chamber 12. The path 22 is preferably a pipe or some suitable conduit capable of transporting fluids. The movement path 22 preferably extends from the combustion chamber 12 to a particle separator 24, then to a blower 26, then to a heat exchanger 28, at which point the path 22 preferably separates into a heavy oil path 22a, which preferably extends from the heat exchanger 28 back to the combustion and regeneration chamber 12, and a cooled effluent gas path 22b, which preferably extends from the heat exchanger 28 to a fractional separator 40. The fractional separator 40 is preferably a fractional distillation tower. A light gas path 22c preferably extends from the fractional distillation tower 40 to a gas storage tank 60 and to the heat exchanger 28, by operation of a control valve 62 as shown. The light gas path 22c is preferably routed through the heat exchanger 28 then preferably back into the combustion zone 14 of the combustion chamber 12. Discharge lines 68 and 70 extend from the combustion chamber 12.

In operation, relatively pure oxygen ($O_2$), and carbon monoxide (CO), are transported into the combustion zone 14 of the combustion chamber 12 by supply lines 64 and 66, respectively, and the flow of said gases is controlled by valves 64a and 66a, respectively. The relatively pure oxygen and the carbon monoxide are combusted in the combustion zone 14 to form carbon dioxide ($CO_2$), and the combustion is preferably controlled to produce heat having a temperature of at least 1200 degrees F. (Fahrenheit). At the same time, crushed oil shale is transported into the destructive distillation zone 18 of the combustion chamber 12.

The combustion so described, along with the supply of crushed oil shale into the destructive distillation zone 18, causes simultaneous reactions within the combustion chamber 12 as part of a recurring combustion/reaction cycle, in which the heat of the combustion breaks down the crushed oil shale to release the petroleum hydrocarbons contained in the shale, leaving retorted oil shale containing carbon residue which is exposed to the carbon dioxide to react and regenerate a carbon monoxide product, leaving spent oil shale, preferably to be discharged as a calcite ($CaCO_3$) or as a calcium oxide lime (CaO) (depending upon the temperatures present in the chamber 12, and in particular in the destructive distillation zone 18) from discharge lines 68 and 70 extending from the combustion chamber 12. The heat of the combustion releases other volatile gases from the crushed oil shale, along with the petroleum hydrocarbons.

The released petroleum hydrocarbons, other volatile gases, and the carbon monoxide product, are transported from the combustion chamber 12 along the movement path 22 through the particle separator 24, which removes particulates from the gaseous stream. When the petroleum hydrocarbons and the carbon monoxide product reach the heat exchanger 28, the heat exchanger withdraws heat from them and transfers that heat to re-routed carbon monoxide product and other light gases traveling along light gas path 22c as shown.

In the heat exchanger 28, a "higher temperature" cooling is made, or a "partial cooling," by removing some, but not all, of the heat from the released petroleum hydrocarbons, carbon monoxide by-product, and other volatile gases. It is preferable to transport only the lighter gases to the fractional distillation tower 40, and since the heaviest gases condense first at higher temperatures than the condensation point of the lighter gases, the heat exchanger 28 and associated controls are adapted to remove enough heat from the gases to cause the heavier gases to condense yet still maintain the lighter gases in gaseous form. As illustrated schematically in FIG. 1, the lighter gases and carbon monoxide being re-routed along light gas path 22c operate to absorb heat from the hot gases flowing along movement path 22. There is accordingly a limit to how much heat can be transferred, and if it is desired to remove more heat from the hot gases flowing along movement path 22 that the lighter gases from along light gas path 22c are capable of removing, a coolant may be required, such as water or any suitable cooling compound, in order to remove more of the heat. It is also to be understood that a user of the apparatus 10 may choose to cool the gases sufficiently to cause not only the heavier gases to condense, but also some of the lighter hydrocarbons as well, and pass them back to the combustion chamber 12 in condensed form along the heavy oil path 22a to break them down further through heat-cracking (defined below).

The heaviest gases condense into a heavy oil that is transported from the heat exchanger 28 along the heavy oil path 22a back into the combustion chamber, preferably at or near the combustion zone 14, in order to reheat and "crack" the heavy oil as the term "crack" is understood in the field to refer to the breaking down of heavy oil into carbons and lighter hydrocarbons. The lighter hydrocarbons produced by "cracking" the heavy oil may be produced in gaseous or liquid form, depending on the circumstances. The lighter petroleum hydrocarbons, along with the regenerated carbon monoxide by-product, are passed from the heat exchanger 28 along the cooled effluent gas path 22b, still in gaseous form, to the fractional separator 40 to undergo "lower temperature cooling" than is accomplished in the heat exchanger 28. The light petroleum hydrocarbons are thereby cooled and processed into useable oils as petroleum products, by any suitable manner known to those skilled in the art of oil processing by a fractional distillation tower.

Accordingly, in the fractional distillation tower 40, cooled effluent gas transported to the tower 40 along the path 22b, is cooled even more in the tower 40, and separated into fractions of light hydrocarbon gases (along with the regenerated carbon monoxide by-product), light shale oil, and middle shale oil, the oils being separable in a range of several different densities. The fractions of light and middle shale oils are discharged from the tower 40 through lines 42, 44, 46, 48, 50, 52, 54, 56, and 58, in accordance with their decreasing densities, respectively. Accordingly, the heavier shale oils are generally discharged from the lower lines 42, 44, 46, 48 and 50, for example, and the lighter shale oils are generally discharged from the higher lines 52, 54, 56 and 58. The fractions of light hydrocarbon gases, and the carbon monoxide by-product, are discharged into light gas path 22c, which preferably extends from the tower 40 to a gas storage tank 60 and to the heat exchanger 28, by operation of a control valve 62 as shown. The light hydrocarbon gases and the carbon monoxide by-product may be transported from the storage tank 60, or directly from the light gas path 22c, as a utility gas for other commercial purposes in other industries.

The exposure of retorted oil shale to heated carbon dioxide in the combustion chamber 12 operates to utilize the retorted oil shale as a carbon source for regenerating carbon monoxide as described above. However, although oil shale is the preferred material for use in the inventive processes described herein, the phrase "carbon source" as used herein shall refer broadly to any carbon containing material capable of reacting with carbon dioxide to produce carbon monoxide. Some examples of a carbon source include oil shale, retorted oil shale, tar sand, retorted tar sand, coal, lignite, municipal waste, forest underbrush and the like.

Those having ordinary skill in the art will recognize that other carbon containing materials could also operate as a "carbon source" under the above definition. Therefore, the phrase "carbon source" as used herein is limited only by functionality, and is in reference to any carbon containing material that can react with carbon dioxide to form carbon monoxide, including the specific examples listed above and any others not listed but that are capable of functioning in the manner described.

The cycle of simultaneous combustion and reaction occurring in the different zones 14, 16 and 18 in the combustion chamber 12 as described above, can be represented stoichiometrically as follows:

| (1) | (oxidation) $2CO + O_2 \rightarrow 2CO_2$ | +135,200 calories per unit of $O_2$ |
|---|---|---|
| (2) | (reduction) $2CO_2 + 2C \rightarrow 4CO$ | −81,600 calories per unit of original $O_2$ from reaction (1). |
| | Total heat/energy produced: | +53,600 calories per unit of original $O_2$ from reaction (1). |

It is seen from the above that reaction (1) is exothermic, while reaction (2) is endothermic. Reaction (2) assumes that there is a sufficient amount of carbon (C) to react with all of the carbon dioxide ($CO_2$) produced in reaction (1), in which case it is noted that the amount of the carbon monoxide by-product of reaction (2) would be twice the amount of carbon monoxide supplied originally as part of reaction (1) above. Of course, if a lesser amount of carbon (C) is supplied to the combustion chamber 12, then the proportions represented above would be different.

The total energy exhausted by the two-step combustion reaction cycle above amounts to +53,600 calories per unit of oxygen ($O_2$), which is the result of the +135,200 calories per unit of oxygen ($O_2$) produce from the exothermic reaction (1) above, reduced by the −81,600 calories per unit of $O_2$ that is absorbed by the endothermic reaction (2).

The prior art combustion methods used in the destructive distillation of oil shale have utilized the combustion of carbon (C) and oxygen ($O_2$) in the ambient air. Carbon that is combusted with ambient air combusts at a much lower temperature than the combustion of carbon monoxide (CO) with relatively pure oxygen ($O_2$) as utilized in accordance with the principles of the present invention. The prior art combustion reaction is illustrated as follows:

| $C + O_2$ (from ambient air) $\rightarrow CO_2$ | +94,400 calories per unit $O_2$ in air |
|---|---|

It will be appreciated, by those having ordinary skill in the art, that the +135,200 calories per unit of oxygen ($O_2$) produced by burning carbon monoxide is a much higher heat of combustion than the +94,400 calories per unit of oxygen ($O_2$) (from ambient air) produced by the prior art combustion reaction above. Applicant prefers to utilize the excess heat by absorbing it directly into the endothermic follow-up reaction (2) above by heating the oil shale to regenerate carbon monoxide (CO) and calcining the calcite in the retorted oil shale residing in the destructive distillation zone 18, without using a heat-transferring medium and the related heat-loss inefficiencies thereof, to regenerate the carbon monoxide (CO) product. Accordingly, the "hot carbon dioxide" ($CO_2$) produced by reaction (1) above is a necessary part of one aspect of the invention.

Applicant discovered the benefit of combusting carbon monoxide (CO) with pure oxygen because that reaction combusts at a higher temperature than carbon (C) combusts with ambient air or which oxygen in an excessive carbonous environment, and combustion of carbon monoxide with pure oxygen thus liberates more heat per unit of oxygen ($O_2$) consumed than does carbon (C), and because the carbon dioxide ($CO_2$) by-product can be used to regenerate carbon monoxide (CO) while consuming the carbon residue normally remaining as retorted oil shale. The purpose of this approach is to recover the heat of combustion as well as to produce carbon monoxide. The process is efficient and excess heat is put to good use by the follow-up reaction (2) above. The prior art processes are disadvantageous because they operate the combustion phase at some location remote from the heat chamber in which the oil shale is transported, the heat of combustion being transmitted to the oil shale by a heat transferring medium through a conduit, which is less efficient and causes heat to be lost.

Further, it will be appreciated that it is in accordance with the principles of the present invention to utilize the apparatus 10 (or portions equivalent to it) to produce carbon monoxide regardless of whether useable oil is also produced. For example, carbon monoxide may be produced, without producing oil, by supplying coal and an alternative source of carbon dioxide into the combustion chamber. For example, by using dolomite ($CaMg(CO_3)_2$) as the alternative source of carbon monoxide, when subjected to the high temperatures in the combustion chamber 12 the dolomite would release carbon dioxide, and that carbon dioxide would react with carbon contained by the coal, as would the carbon dioxide produced by the combustion of carbon monoxide and oxygen, to produce carbon monoxide. The alternative source of carbon dioxide would be used as an energy-balancing imperative (just as the calcite in the oil shale is used), in that some of the heat energy produced by the combustion would be absorbed by the dolomite by heating the dolomite to release the carbon dioxide and causing that carbon dioxide product to react with the carbon contained in the coal.

[1] Any suitable alternative source of carbon dioxide may be utilized, such as by directly supplying relatively pure carbon dioxide, or by utilizing carbon dioxide that is released in a chemical reaction as is known in conjunction with dolomite ($CaMg(CO_3)_2$).

It is thus within the scope of the present invention to regenerate carbon monoxide in any suitable manner desired. For example, a method of generating carbon monoxide in accordance with the principles of the present invention, in a most basic form, could involve the following part:

(a) reacting a hot carbon dioxide with a carbon source to thereby produce carbon monoxide.

A method of regenerating carbon monoxide in accordance with the principles of the present invention could involve the following parts:

(a) combusting oxygen and a first source of carbon monoxide to thereby form a hot carbon dioxide by-product; and (b) conveying the hot carbon dioxide by-product into contact with a carbon source within a reaction chamber, wherein said hot carbon dioxide reacts with said carbon source to regenerate a carbon monoxide by-product.

The method above may be further augmented with the following part:

(c) transporting the carbon monoxide to a storage tank or to a work site for use in a process at said work site.

The method above may be still further augmented, wherein part (b) further comprises producing a carbon monoxide by-product that is approximately twice the volume of carbon monoxide utilized in the combusting of carbon monoxide from said first source of carbon monoxide in part (a).

The method above may be still further augmented, wherein part (a) further comprises combusting relatively pure oxygen and a first source of carbon monoxide to thereby form the hot carbon dioxide by-product.

The method above may be additionally augmented, wherein the carbon source of part (b) comprises coal.

It is to be understood that the phrase "conveying the hot carbon dioxide by-product into contact with a carbon source within a reaction chamber," in part (b) of the method above, could be accomplished by the apparatus 10, or any suitable modification thereof. For example, the combustion of carbon monoxide and relatively pure oxygen could be accomplished at some location separate and remote from the chamber 12, and the hot carbon dioxide by-product thereafter conveyed into the chamber 12, making it essentially a reaction chamber and not a combustion chamber.

As noted herein previously, the combustion (reaction (1) above) is preferably controlled to produce heat having a temperature of at least 1200 degrees F. (Fahrenheit). It will be appreciated that the actual temperature of the combustion, and of the carbon dioxide ($CO_2$) by-product, can be controlled despite the heat energy being produced by the combustion, simply by controlling the amount of carbon monoxide (CO) supplied for the combustion step (1), because combustion requires oxygen ($O_2$) and the amount of carbon monoxide that can be burned in a reaction with oxygen is thus limited by the amount of oxygen present.

Accordingly, if more carbon monoxide is supplied to the combustion chamber 12 than can react with the amount of the oxygen that is supplied, part of the carbon monoxide will remain unreacted and will therefore not burn. Therefore, if a sufficiently larger amount of carbon monoxide is supplied, it will remain at its lower, unreacted temperature to thereby "dilute" the temperature of the heat of the combustion. Accordingly, the overall temperature inside the reaction chamber 12, at the combustion zone 14 and elsewhere, can be reduced by increasing the amount or rate of carbon monoxide being supplied, and vice versa.

More specifically, one aspect of the invention is to reduce the temperature of the combustion zone 14 by increasing the carbon monoxide supply rate relative to the oxygen supply rate, or alternatively by decreasing the oxygen supply rate. Another aspect of the invention is to increase the temperature of the combustion zone 14 by reducing the carbon monoxide supply rate relative to the oxygen supply rate, or by increasing the oxygen supply rate. Accordingly, users have the option to increase or decrease the temperature, and total heat usage, of the apparatus 10, in these manners.

It was mentioned above that spent oil shale is preferably discharged from the combustion chamber 12 as a calcite ($CaCO_3$) or as a calcium oxide lime (CaO) from discharge lines 68 and 70 extending from the combustion chamber 12, depending upon the temperatures present in the chamber 12, and in particular in the destructive distillation zone 18. More specifically, it is noted that calcites can be produced as part of the combustion step, if the temperature within the combustion chamber is maintained low enough. It is presently understood by applicant that exposing oil shale to a high-temperature heat that is less than 1648 degrees F., at standard atmospheric pressure, will reduce the oil shale to a calcite. A further aspect of the invention, in accordance with applicant's present understanding, is that the oil shale will be transformed to a calcium oxide lime product if the temperature maintained in the destructive distillation zone 18 is greater than 1648 degrees F., at standard atmospheric pressure. Controlling the temperatures present within the combustion chamber 12, therefore, is an important aspect of the present invention in choosing whether to transform the spent oil shale into a calcite or a calcium oxide lime. The calcite or the calcium oxide lime can be put to many constructive, industrial uses, such as in producing cement.

In accordance with the features and combinations described above, a preferred method of extracting oil from oil shale includes the following parts:

(a) producing combustion within a combustion chamber;
(b) transporting oil shale into the combustion chamber; and
(c) heating the oil shale by exposing it directly to the heat from the products of the combustion, without aid of an intervening heat-transferring medium, to thereby heat the oil shale to a temperature sufficient to release oil therefrom.

The phrase "without aid of an intervening heat-transferring medium" shall refer broadly to the concept of exposing the oil shale to the heat produced by the combustion of oxygen and carbon monoxide and to hot carbon dioxide which is the product of that combustion, without an intervening element operating to (i) withdraw heat from the combusting gases and (ii) either dispense the heat to the oil shale or transport heated gases from a combustion chamber to a retort chamber. It is to be understood that although the gases produced by the combustion phase of the present invention serve to transport heat within the chamber 12, said gases would not constitute an "intervening heat-transferring medium" relative to the combustion or the oil shale, as that phrase is intended, because those gases are either part of the combustion itself or are a product of the combustion.

An example of an "intervening heat-transferring medium" would include the use of a solid heat-carrying material, such as spent oil shale, spent dried sludge, clay pellets, or metal pellets, which are heated and then moved into contact with oil shale (preferably by conveying the heat-carrying material through a heat carrier line at high temperatures and discharged from the line into the chamber containing the oil shale). Another example would be a heat carrier line itself, separate from the retort chamber, for conveying a heat carrier (whether the heat carrier is a solid or a gas) from a combustion chamber to a separate retort chamber, in which a primary purpose of the line is simply to transport the heat carrier for communication with the oil shale. The use of an intervening heat-transferring medium is described, for example, in U.S. Pat. No. 4,670,104 (granted Jun. 2, 1987 to Taylor), which is incorporated herein by reference.

Figure 2:
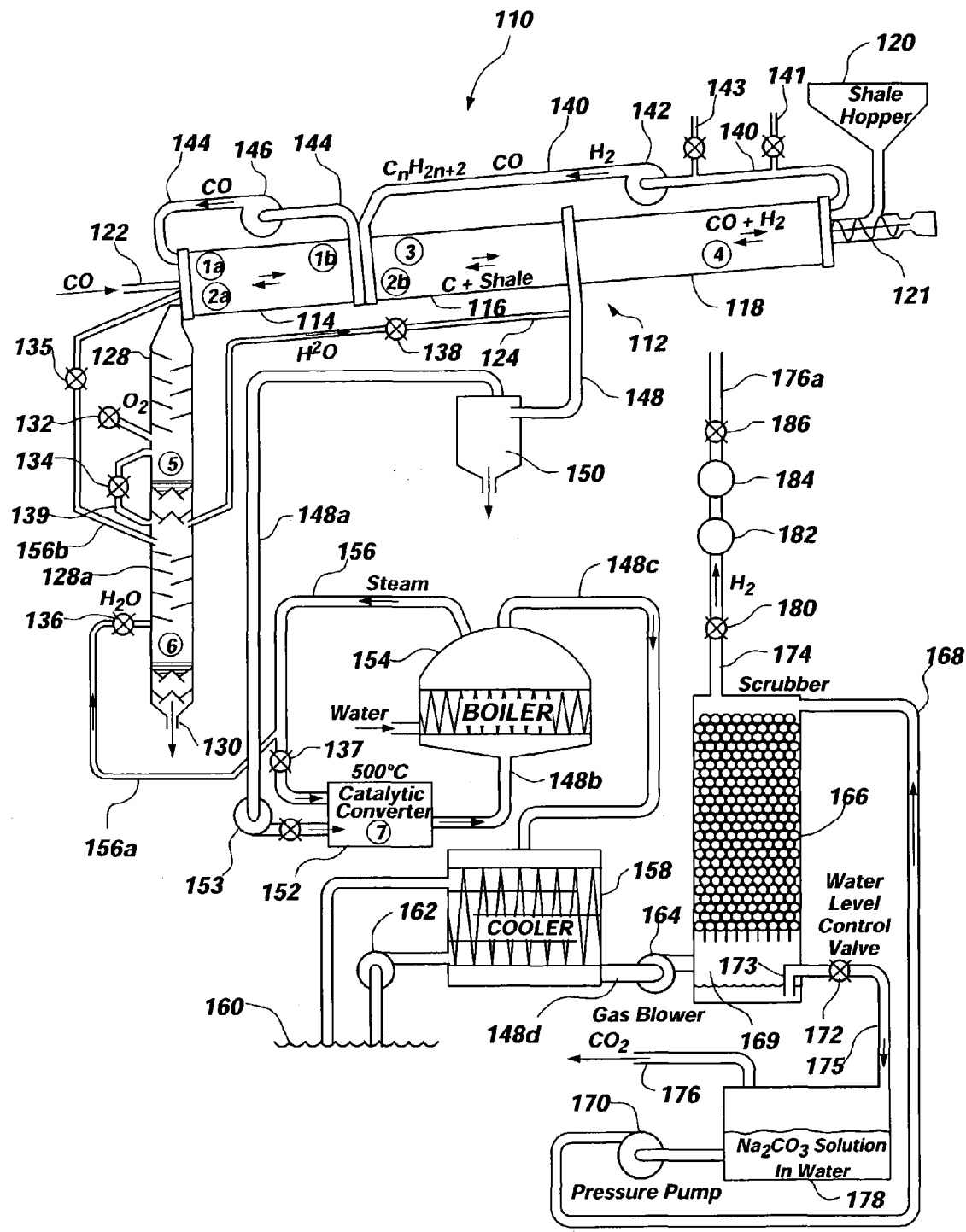
FIG. 2 is a schematic view of an apparatus for producing hydrogen.

Referring now to FIG. 2, there is shown a schematic view of an apparatus, designated generally at 110, for producing hydrogen. It will be appreciated that the depiction in FIG. 2 is schematic in nature, and is therefore not intended to depict the apparatus 110 in detail. As previously discussed, the present embodiments of the invention illustrated herein are merely exemplary of the possible embodiments of the invention, including that illustrated in FIG. 2. It will be appreciated that the hydrogen producing apparatus 110 may be used in combination with the oil shale reduction apparatus 10, as excess carbon monoxide produced from the oil shale reduction apparatus 10 may be used with the hydrogen producing apparatus 110. The carbon monoxide may be diverted from valve 62 of the oil shale reduction apparatus 10 for use with the hydrogen producing apparatus 110. It will also be understood that the hydrogen producing apparatus 110 may be used without any connection to the oil shale reduction apparatus 10.

The hydrogen producing apparatus 110 may include a hydrogen producing combustion chamber 112, also sometimes referred to herein as a reaction chamber. The chamber 112 may be formed in a similar manner as the combustion chamber 12 discussed above. For example the chamber 112 may include a rotary kiln, such as a rotating pyrolysis drum retort, a static mixer retort, a gravity flow retort, a fluid bed retort, a screw conveyor retort, or some other type of retort useable in accordance with the principles of the invention. The chamber 112 may include a first zone 114, a second zone 116, and a third zone 118.

Reactions and phenomena occurring in the different zones 114, 116 and 118 in the chamber 112, and in other portions of the hydrogen producing apparatus 110 can be represented stoichiometrically as follows:

$$2CO + O_2 \rightarrow 2CO_2 + 135{,}200 \text{ calories/mole;} \qquad (1a)$$

$$CO_2 + C \rightarrow 2CO - 40{,}800 \text{ calories/mole;} \qquad (1b)$$

$$2H_2 + O_2 \rightarrow 2H_2O + 115{,}660 \text{ calories/mole;} \qquad (2a)$$

$$H_2O + C \rightarrow H_2 + CO - 31{,}400 \text{ calories/mole;} \qquad (2b)$$

$$C_nH_{(2n+2)} \rightarrow C_n + H_{(2n+2)} \text{—approximately 5,000 calories per n, where n is an integer;} \qquad (3)$$

$$C_nH_{(2n+2)}(\text{solid}) + \text{Heat} \rightarrow \text{vapor } C_nH_{(2n+2)}; \qquad (4)$$

$$O_2 \text{ at ambient temperature} \rightarrow O_2 \text{ superheated;} \qquad (5)$$

$$H_2O \rightarrow \text{superheated } H_2O; \qquad (6)$$

$$CO + H_2O + \text{catalyst} \rightarrow CO_2 + H_2. \qquad (7)$$

The general location where each of the above reactions takes place is indicated by the corresponding reaction numbers in FIG. 2. It will be understood that the heat of reaction values indicated above are approximate values for illustrative purposes only, and that other heat of reaction values may occur within the scope of the present invention.

The apparatus 110 may also include an input hopper 120, for loading an input, such as oil shale, into the chamber 112 near the third zone 118. The oil shale may be crushed, for example, into particles ranging from 0 to 25 millimeters, and carried to the chamber 112 using sealed conveyance means 121.

The chamber 112 may be operated by placing input such as oil shale in the input hopper 120. The oil shale may enter the third zone 118 of the chamber 112 where the temperature may range from a low of between approximately 300–400 degrees F. up to approximately 800 degrees F. The oil shale may then travel through the chamber 112 from the third zone 118 to the second zone 116 to the first zone 114. The temperatures in the second zone 116 may range from approximately 800 degrees F. adjacent to the third zone 118 up to approximately 1100 degrees F. adjacent to the first zone 114. The first zone 114 may have temperatures ranging from between approximately 1100 degrees F. near the second zone 116 to approximately 1800 degrees F. at the end of the first zone 114 opposite the second zone 116. It will be appreciated that other temperatures may be used in the chamber 112 within the scope of the present invention.

Carbon monoxide may be introduced into the first zone 114 of the chamber 112 through a carbon monoxide line 122. As discussed above, the carbon monoxide may be supplied from the valve 62 of the shale reduction apparatus 10, or from any other source within the scope of the present invention. The oil shale in the chamber 112 may be heated from the combustion of carbon monoxide along with minimal amounts of hydrogen and with oxygen which originates in the first zone 114 of the chamber 112. The heat that is derived from reactions 1a and 2a may be conveyed from the first zone 114 to the third zone 118 by means of gases that may be generated through a series of reactions that occur in the first zone 114 and the second zone 116. The hydrocarbons in the shale may be heated by the sensible heat in these gases, which flows countercurrent to the shale, transferring sufficient heat to vaporize the hydrocarbons completely before the shale passes downward to the first zone 114. This is characterize by reaction 4. These vapors may be drawn off from the upper end of the third zone 118 through a first gas re-circulation line 140. Also, spent heat conveying gases, mainly hydrogen and carbon monoxide, may be directed through the first gas re-circulation line 140 by means of a first blower 142. The gases may be transferred to the lower end of the second zone 116 through the first gas re-circulation line 140. As the gases and hydrocarbon vapor discharge from the first gas re-circulation line 140 and enter the second zone 116 they may be met with a blast of super hot gases from the first zone 114. These gases may heat the hydrocarbon vapor above a temperature for which it may be decomposed into free hydrogen and carbon. This reaction, R3, may absorb about 5,000 cal/CH$_2$ and similarly about 5,000 calories for each segment of the chain of the molecular structure, in compounds of the methane series of hydrocarbons. The carbon may precipitate forming a coke coating on the shale as it tumbles along the chamber 112. The hydrogen may be re-circulated with the carbon monoxide through the third zone 118, conveying more sensible heat to vaporize the hydrocarbons. A portion of the hydrogen and carbon monoxide may also be withdrawn through ports in the shell of the chamber 112 into an effluent gas output line or path 148. These gases may be at an appropriate temperature to be further processed down stream. This process is described in greater detail below.

The shale may be allowed to tumble downward in the chamber 112 into the first zone 114. Here the carbonized shale may be buffeted by the gases from reactions 1a and 2a from the combustion of the gases recirculating through a second gas re-circulation line 144. The second gas re-circulation line 144 may be used to direct gas, including carbon monoxide, from the junction between the first zone 114 and the second zone 116 to the opposite end of the first zone 114. A second blower 146 may be positioned on the second gas re-circulation line 144 to force the flow of gas in the desired direction.

Super heated oxygen may be injected into the first zone 114 from an oxygen pre-heater 128. The flow of oxygen may be controlled by an oxygen valve 132. The oxygen may ascend upward through hot descending spent shale in the oxygen pre-heater 128. Reactions 1a and 2a may occur in the first zone 114, producing much thermal energy, carbon dioxide and super heated steam. These hot gases may impinge on the coke or carbonized shale resulting in reactions 1b and 2b, to take place producing carbon monoxide and hydrogen and consuming the carbureted material along with absorbing considerable quantities of thermal energy. A portion of these gases may be re-circulated through the second gas re-circulation line 144 by means of the second blower 146. The combustion of theses gases with oxygen may furnish all the thermal energy for the reactions, both chemical and physical, that take place in the chamber 112. The summation of the energy released from reaction 1a and 1b may be approximately 53,600 cal/mole of oxygen consumed. This may be far excessive for the thermal requirements of the process. To compensate for this excessive energy and to convert the excessive thermal energy to a useful chemical energy and moderate the climate in first zone 114, a flow of steam may be introduced into a steam pre-heater 128a. The steam may also be super heated by hot spent shale which may be ejected from the first zone 114 through the oxygen pre-heater 128, and on into the steam pre-heater 128a. The steam may be derived from a boiler 154. The boiler 154 may include a series of tubes for receiving water. As the hot effluent from the catalytic converter 152 is passed through the boiler 154, the heat from the effluent may be absorbed by the water in the tubes. Accordingly, the temperature of the effluent may be reduced and steam may be generated.

Steam generated from the boiler 154 may be circulated for use in the chamber 112 through steam path 156, 156a, 156b. It will also be understood that steam may likewise be diverted from the boiler 154 for some other use. The steam may be conveyed through steam path 156, 156a and injected into the first zone 114 through steam path 156b. It will be appreciated that the flow of steam may be controlled by steam control valves, such as a first steam control valve 134, a second steam control valve 135, a third steam control valve 136, a fourth steam control valve 137, and a fifth steam control valve 138. Moreover, it will be appreciated that various different configurations and quantities of valves may be used to control the flow of gasses within the scope of the present invention.

The steam may react with the coke generating more hydrogen and carbon monoxide and absorbing heat, characterized by reaction 2b. Thus by controlling the flow of the oxygen and steam, such as through the oxygen valve 132 and the second steam control valve 135, the thermal climate and rate of the process can be controlled. The spent shale may be rejected from the steam pre-heater 128a through a waste port 130 after heating the moderating gas. The coke may pass through the waste port 130 for use as a product or waste. The coke material passing through the waste port 130 may include residue from the oil shale such as calcium carbonates.

It may be desirable to synchronized the rate of feed of the oil shale into the chamber 112 with the flow of the oxygen, steam and carbon dioxide such that the coke which is coating the shale is consumed only slightly before it is discharged into the oxygen pre-heater 128. By accomplishing this the spent shale can be insulated from the buffeting heat. Also, the shale may be prevented from being calcined, robbing energy from the process and producing carbon dioxide from an unwanted source. In the event the coke coating the shale is not completely consumed before the shale is discharged into the oxygen pre-heater 128, the oxygen reacts with the coke in the oxygen pre-heater 128 producing an extremely high temperature. To compensate for this, steam may be injected into the oxygen pre-heater 128 through the first steam control valve 134 and conduit 139, to moderate the temperature in the oxygen pre-heater 128 until the coke is consumed.

It may be desirable to have the temperature of the hydrogen and carbon monoxide discharged from second zone 116 into the gas output line 148 ranging at around 500 degrees C., or between approximately 900 degrees and 950 degrees F. for example. These gases may be conveyed to a particle separator 150 en route to a catalytic converter 152 through the gas output line 148a by means of catalytic converter blower 153. The particle separator 150 may include any variety of devices configured for removing particulates from a gaseous stream. The catalytic converter 152 may be a chamber for reactions that may contain a metal catalyst into which the effluent gasses from the chamber 112 may be passed so that hydrogen and carbon dioxide may be produced. The metal catalyst may be disposed on surfaces within the catalytic converter 152 so as to contact the effluent gasses. Various different metals may be used as the catalyst. For example, ferric oxide ($Fe_2O_3$) or chromic oxide ($Cr_2O_3$) may be used as well as any other substance known in the art of catalytic converters. Examples of the reactions occurring in the catalytic converter 152 include the following, if desired, possible, or feasible:

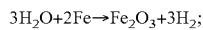

$3H_2O + 2Fe \rightarrow Fe_2O_3 + 3H_2$;

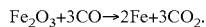

$Fe_2O_3 + 3CO \rightarrow 2Fe + 3CO_2$.

The catalytic converter 152 can be used to carry oxygen from the steam to the carbon monoxide to produce a hydrogen and carbon dioxide effluent. The hydrogen and carbon dioxide effluent of the catalytic converter 152 may be carried through effluent path 148b to be cooled by passing through the boiler 154.

The hydrogen and carbon monoxide discharged from the second zone 116 may percolate up through multiple beds of selected metal oxides and catalysts, along with steam. This steam may be generated in the boiler 154. The steam may flow directly to the catalytic converter 152 through the steam path 156 and the fourth steam control valve 137 as saturated steam or the steam may flow into the steam pre-heater 128a, being super heated by the hot spent shale. The steam may then be discharged through the steam line 124 and the fifth steam control valve 138 into the gas output line 148 along with the carbon monoxide and hydrogen before it is conveyed through particle separator 150 en route to the catalytic convert 152. It will be understood that the steam entering the catalytic converter 152 may be super-heated to a temperature of approximately 500 degrees C., either through a super-heater included as part of the boiler 154, or other super heating device or method known in the art.

The catalyst in the catalytic converter 152 may progressively remove oxygen from the steam transferring it to the carbon monoxide and producing carbon dioxide and hydrogen characterized by reaction 7. This process is slightly to moderately exothermic. The summation of the thermal energy of the gases leaving the catalytic converter 152 being somewhat greater than the gases entering it, these gases may be at a thermal state such that their sensible heat can generate a significant quantity of steam in the boiler 154. This steam may be utilized as previously described. The hydrogen, carbon dioxide and steam may be conveyed through the gas output line 148c to a cooler 158. Cooler 158 may include any variety of cooling devices known in the art such as cooling towers in which water is circulated to absorb heat and lower the temperature of the effluent gasses through evaporation. In one embodiment, water may be supplied to the cooler 158 from a cooling pond 160. A pump 162 may be used to circulate the water from the cooling pond 160 to the cooler 158. Accordingly, the water vapor, hydrogen and carbon dioxide from the effluent of the boiler 154 may be cooled. Most of the water vapor may be condensed in the cooler 158.

The remaining hydrogen and carbon dioxide from the cooler 158 may be conveyed to a scrubber 166 through gas output line 148d by means of a high pressure blower 164. The scrubber 166 may be configured in any manner known in the art. For example, the scrubber 166 may include an enclosure for receiving a solution configured to absorb the carbon dioxide. The solution for absorbing carbon dioxide may be sodium carbonate ($Na_2CO_3$) in water for example. However, it will be appreciated that any carbon dioxide absorbing material known to those skilled in the art of scrubbers may be used, such as sodium hydroxide (NaOH) or calcium oxide (CaO), for example.

The scrubber 166 may be pressurized by the gases from the blower 164. The middle portion of the scrubber 166 may be filled with strong and chemically inert nodules of a moderate and uniform size such that they will allow the gases and the liquid to counter flow passed one another. A torrent of a solution of water and sodium carbonate may be pumped up through a scrubber re-circulation line 168 by means of a pressure pump 170. The solution may enter the scrubber 166 flooding the top of the nodules and cascading downward through the nodules as the gases percolate up through this mass of nodules. This action may create a condition wherein the carbon dioxide goes into solution and is swept downward to a reservoir 169 as solute in the soluble water. This pressurized solution of water may now be laden with carbon dioxide. As the solution continually cascades downward, the carbon dioxide being fairly soluble and hydrogen being only very slightly soluble, the carbon dioxide may be leached from the gas solution leaving the gas that bubbles to the surface, or top of the scrubber 166, being fairly pure hydrogen gas. The reservoir 169 of water may be retained by a water level control valve 172 which may prevent the gases from exhausting through an intake 173. As the water level rises the control valve 172 may release the flow of water in accordance to the water level in the reservoir 169. The water may flow through a water line 175 to a holding tank 178 where it may be depressurized and the carbon dioxide may rise out of the solution. The carbon dioxide may be removed through a carbon dioxide outlet 176 for disposal or use.

The hydrogen, after being cleansed in the scrubber 166, may be discharged through a scrubber outlet 174, and pressure relief valve 180 en route to a pressure vessel 184 by means of a compressor 182. The hydrogen can now be distributed through hydrogen outlet 176a and valve 186.

In as much as a phase in period may be required for a transition from the widespread use of petroleum to a widespread use of hydrogen fuel, the present invention provides an optional feature that may accommodate this need. A portion of the hydrocarbon vapors in the first gas re-circulation line 140 may be diverted through optional diversion means 141. The vapors may be then processed to the desired products and the unusable hydrocarbons and carbon monoxide may be returned back to the hydrogen generating apparatus 110 through gas return means 143 to be used in generating hydrogen. For example, the gas in the first gas re-circulation line 140 may include vaporized hydrocarbons which may be diverted through the optional diversion means 141 for use outside the hydrogen generating apparatus 110 if so desired. The gasses diverted through the optional diversion means 141 may include hydrocarbons, carbon monoxide and hydrogen. These gasses may be used to produce oil products. Light hydrocarbons, carbon monoxide and hydrogen remaining after the oil products have been produced may be directed back into the re-circulation line 140 through gas return means 143.

Figure 3:
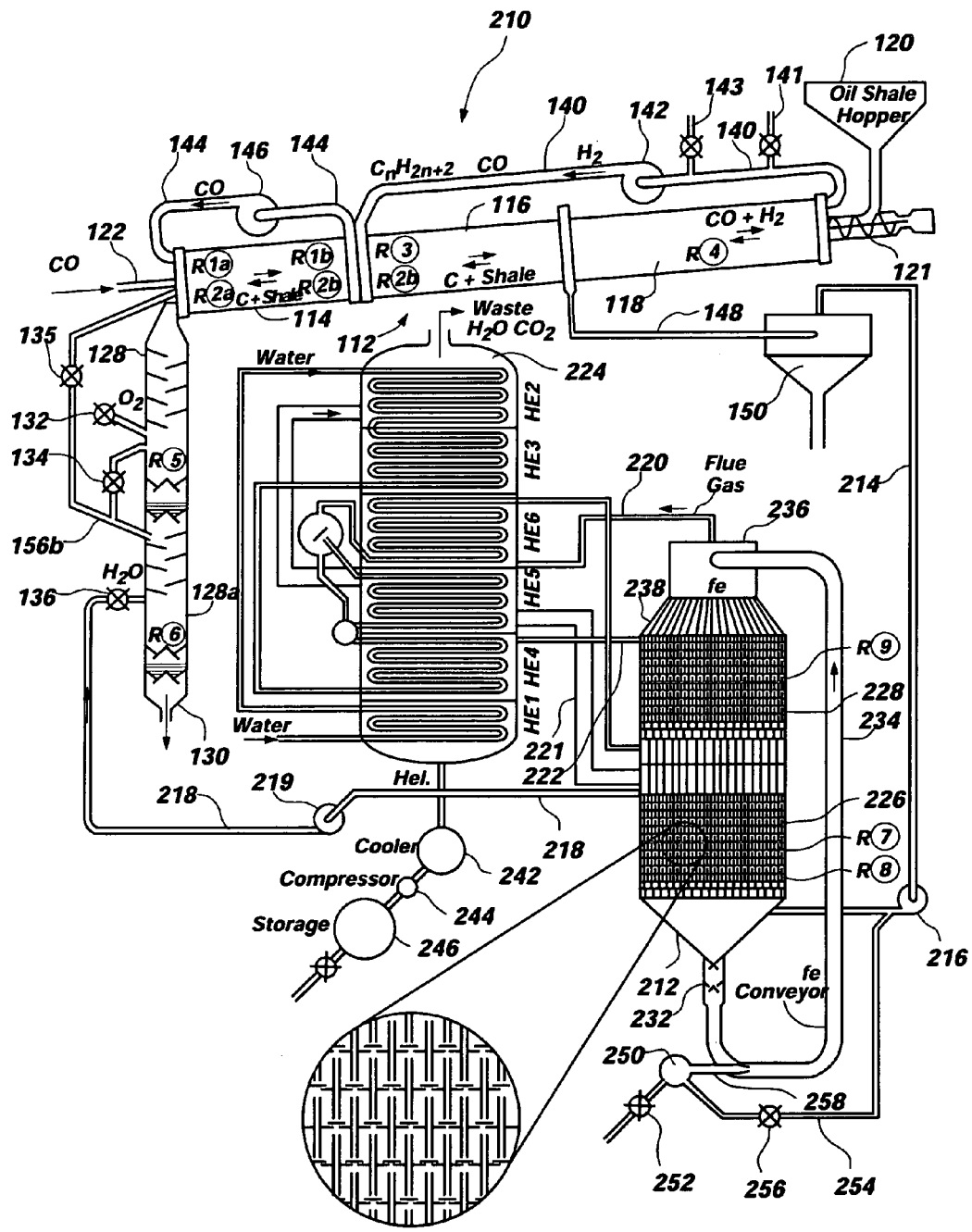
FIG. 3 is a schematic view of an alternative apparatus for producing hydrogen.

Referring now to FIG. 3, there is shown a schematic view of a further embodiment of the apparatus, designated generally at 210, for producing hydrogen. As previously discussed, the present embodiments of the invention illustrated herein are merely exemplary of the possible embodiments of the invention, including that illustrated in FIG. 3.

It will be appreciated that the embodiment of the invention illustrated in FIG. 3 contains many of the same structures represented in FIG. 2 and only the new or different structures will be explained to most succinctly explain the additional advantages which come with the embodiments of the invention illustrated in FIG. 3.

Reactions and phenomena occurring in the different zones 114, 116 and 118 in the chamber 112, and in other portions of the hydrogen producing apparatus 210 can be represented stoichiometrically as follows:

$2CO+O_2 \rightarrow 2CO_2+135,200$ calories/mole; (R1a)

$CO_2+C \rightarrow 2CO-40,800$ calories/mole; (R1b)

$2H_2+O_2 \rightarrow 2H_2O+115,660$ calories/mole; (R2a)

$H_2O+C \rightarrow H_2+CO-31,400$ calories/mole; (R2b)

$C_nH_{(2n+2)} \rightarrow C_n+H_{(2n+2)}$—approximately 5,000 calories per n, where n is an integer; (R3)

$C_nH_{(2n+2)}(solid)+Heat \rightarrow vapor\ C_nH_{(2n+2)}$; (R4)

$O_2$ at ambient temperature $\rightarrow O_2$ superheated; (R5)

$H_2O+CO_2 \rightarrow$ superheated $H_2O+CO_2$; (R6)

$Fe_3O_4+4H_2 \rightarrow 3Fe+4H_2O$; (R7)

$Fe_3O_4+4CO \rightarrow 3Fe+4CO_2$; (R8)

$3Fe+4H_2O \rightarrow Fe_3O_4+4H_2$. (R9)

The general location where each of the above reactions takes place is indicated by the corresponding reaction numbers in FIG. 3. As indicated above, it will be understood that the heat of reaction values presented are approximate values for illustrative purposes only, and that other heat of reaction values may occur within the scope of the present invention. Operation of the chamber 112 for the embodiment depicted in FIG. 3 may be similar to that described above for FIG. 2.

The hydrogen and carbon monoxide discharged from the chamber 112 into the gas output line 148 may be conveyed to the particle separator 150 in route to an inverted conical collector 212 of a ferrous deoxidizer 226, through conduit 214 and a blower 216. The hydrogen and carbon monoxide may then percolate up in the ferrous deoxidizer 226 through multiple fluidized beds of magnetite which progressively move downward. The hydrogen and carbon monoxide remove the oxygen from the magnetite reducing the $Fe_3O_4$ to Fe. The hydrogen and carbon monoxide may be oxidized to $H_2O$ and $CO_2$ characterized by reactions R7 and R8. Portions of these gasses may be discharged through conduit 218 through blower 219 into the steam pre-heater 128a. The remaining gas may be discharged through conduit 221. This hot gas along with the heat combined from the hot gases conducted through conduits 220 and 222 may furnish the heat necessary to generate steam in a heat extracting apparatus 224. It will be appreciated that the heat extracting apparatus 224 may be comprised of any variety of heat exchanger or cooling device known in the art for extracting heat, and possibly generating steam. The steam may be injected into a ferrous oxidizer 228, also referred to as a hydrogen generator or metallic iron chamber 228. This steam may react with metallic iron in the metallic iron chamber 228 generating hydrogen and magnetite characterized by reaction R9. The iron may serve as a vehicle to carry oxygen from the $H_2O$ in the metallic iron chamber 228 to the carbon monoxide and hydrogen into ferrous deoxidizer 226.

This process may generate a near pure virgin hydrogen and magnetite in the metallic iron chamber 228, and carbon dioxide, steam and metallic iron in the ferrous deoxidizer chamber 226.

The metallic iron may be collected in inverted conical collector 212 then ejected through gas locks 232 into a conduit 234. The metallic iron may be conveyed through conduit 234 up into a separator 236 by means of a hot gas conveyor 250. The hot gas conveyor 250 may include a combustion chamber equipped with an air supply controlled by an air supply control valve 252. Also, a gas supply may be provided to the hot gas conveyor 250 through a gas conduit 254 and a gas control valve 256. An exhaust conduit 258 may be used to eject hot gasses from the hot gas conveyor 250 into the conduit 234 propelling the metallic iron up into the separator 236. After the hot gasses pass through the separator 236, the gas may continue through conduit 220 to the heat extracting apparatus 224. It will be understood, however, that other conveyance means known in the art may be used within the scope of the present invention to transport the metallic iron to the separator 236.

The metallic iron may be composed of small particles of two to three millimeters and smaller. These particles may descend into distribution tubes 238. When the tubes 238 are filled with the varying sizes of particles, it makes a near gas tight seal between separator 236 and the metallic iron chamber 228. These particles descend downward from fluidized bed to bed as the steam percolates up through the particles, thereby completing a continuous cycle.

The gases ejected from the chamber 112 may be 500 degrees C. or above and the summation of reactions R7 and R8 may be slightly exothermic. Reaction R9 may be somewhat more exothermic. The volumes of the gases entering the ferrous deoxidizer 226 may be equal to the volume exiting it. The thermal energy exiting the hydrogen generator 228 and ferrous deoxidizer 226 may exceed the requirement to generate steam for the hydrogen generator 228. After heat is extracted from these gases, the waste may be disposed and the hydrogen may be cooled in cooler 242, compressed using a compressor 244, and stored in a storage tank 246 for distribution.

It will be understood that other materials besides iron may be used to carry oxygen from the $H_2O$ in the hydrogen generator 228 within the scope of the present invention.

Those having ordinary skill in the relevant art will appreciate the advantages provide by the features of the present invention. For example, it is a feature of the present invention to provide a process and apparatus for producing hydrogen from oil shale that produces a nearly pure hydrogen. It is an additional feature of the present invention to provide a process and apparatus for producing hydrogen from oil shale that is efficient in use of heat and fuel. It is a further feature of the present invention to provide a process and apparatus for extracting oil from oil shale that is simple in design and operation. It is another feature of the present invention, in accordance with one aspect thereof, to provide such an apparatus that can produce an excess of carbon monoxide for use as a commercial fuel in other industries. It is an additional feature of the present invention, in accordance with one aspect thereof, to provide such an apparatus that minimizes the presence of gases that are nonessential to the extraction of oil from oil shale. It is a further feature of the present invention, in accordance with one aspect thereof, to provide such an apparatus that is capable of recovering unused heat produced in a combustion phase of the oil extraction process. It is an additional feature of the invention, in accordance with one aspect thereof, to provide such an apparatus in which a reactant in the process is regenerated and is reusable in the process.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been shown in the drawings and fully described above with particularity and detail in connection with what is presently deemed to be the most practical and preferred embodiment(s) of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A method of producing hydrogen from oil shale, said method comprising:
   (a) transporting oxygen, and a first source of carbon monoxide, into a combustion chamber;
   (b) transporting oil shale into the combustion chamber;
   (c) combusting the oxygen and the carbon monoxide as part of a combustion cycle to form carbon dioxide therefrom and to heat the oil shale sufficiently to release petroleum hydrocarbons from said oil shale;
   (d) placing the combustion chamber into communication with an enclosed gas movement path along which the first source of carbon monoxide is conveyed, such that said enclosed gas movement path, coupled with the use of oxygen, collectively operates to minimize or eliminate aggregation of gases that are nonessential to the combustion cycle; and
   (e) transporting carbon monoxide produced in said combustion chamber to a hydrogen producing combustion chamber and combusting said carbon monoxide with oil shale to produce hydrogen.

2. The method of claim 1, wherein part (e) further comprises supplying oxygen to the hydrogen producing combustion chamber.

3. The method of claim 1, wherein part (e) further comprises supplying steam to the hydrogen producing combustion chamber.

4. The method of claim 1, further comprising passing the oil shale countercurrent to the flow of gas in the hydrogen producing combustion chamber.

5. The method of claim 1, further comprising diverting an effluent gas from the hydrogen producing combustion chamber and passing the gas through a particle separator to remove particles from the gas.

6. The method of claim 1, further comprising cooling a hydrogen producing combustion chamber effluent gas containing said hydrogen in a boiler.

7. The method of claim 6, further comprising passing said effluent gas through a catalytic converter to produce carbon dioxide.

8. The method of claim 7, further comprising cooling said effluent gas in a cooler.

9. The method of claim 8, further comprising forcing the flow of said effluent gas with at least one blower.

10. The method of claim 9, further comprising passing said effluent gas through a scrubber to separate the hydrogen from the carbon dioxide.

11. The method of claim 1, further comprising passing a hydrogen producing combustion chamber effluent gas containing said hydrogen through a scrubber to separate the hydrogen.

12. The method of claim 11, further comprising supplying a carbon dioxide absorbing solution to the scrubber.

13. The method of claim 12, further comprising forming said carbon dioxide absorbing solution with sodium carbonate and water.

14. The method of claim 12, further comprising supplying said carbon dioxide absorbing solution under pressure.

15. The method of claim 14, further comprising circulating said carbon dioxide absorbing solution through said scrubber.

16. The method of claim 15, further comprising depressurizing said carbon dioxide absorbing solution to release carbon dioxide from said carbon dioxide absorbing solution.

17. The method of claim 1, further comprising passing an effluent gas containing said hydrogen through a catalytic converter.

18. The method of claim 17, further comprising converting carbon monoxide to carbon dioxide in said catalytic converter.

19. The method of claim 18, further comprising placing steam in said catalytic converter.

20. The method of claim 1, further comprising diverting an effluent gas from the hydrogen producing combustion chamber and passing the gas through a ferrous deoxidizer.

21. The method of claim 20, further comprising percolating the gas through multiple fluidized beds of magnetite.

22. The method of claim 20, further comprising diverting an effluent gas from the ferrous deoxidizer to a heat extracting apparatus.

23. The method of claim 22, further comprising producing steam in the heat extracting apparatus.

24. The method of claim 23, further comprising placing the steam in the ferrous deoxidizer.

25. The method of claim 20, further comprising circulating metallic iron through the ferrous deoxidizer.

26. The method of claim 20, further comprising reacting iron with steam in the ferrous deoxidizer to produce hydrogen.

27. A method of regenerating carbon monoxide for producing hydrogen, said method comprising:
   (a) combusting oxygen and a first source of carbon monoxide to thereby form a hot carbon dioxide by-product;
   (b) conveying the hot carbon dioxide by-product into contact with a carbon source within a combustion chamber, wherein said hot carbon dioxide reacts with said carbon source to regenerate a carbon monoxide by-product;
   (c) combusting said carbon monoxide by-product with hydrocarbons, oxygen and steam to produce hydrogen producing combustion chamber to produce hydrogen.

28. The method of claim 27, further comprising cooling said hydrogen in a boiler.

29. The method of claim 28, further comprising passing said hydrogen through a catalytic converter.

30. The method of claim 27, further comprising passing said hydrogen through a scrubber.

31. The method of claim 27, further comprising passing said hydrogen through fluidized beds of magnetite.

32. A method of producing hydrogen from a carbon source, said method comprising:
   (a) producing hydrocarbons and carbon monoxide from said carbon source;

(b) combusting the hydrocarbons and carbon monoxide in a reaction chamber with steam and oxygen to thereby form an effluent containing hydrogen;
(c) separating the hydrogen from the effluent; and
(d) passing the carbon source countercurrent to a flow of gas in the reaction chamber.

33. The method of claim 32, further comprising passing the effluent containing hydrogen through a catalytic converter.

34. The method of claim 32, further comprising cooling the effluent containing hydrogen in a boiler.

35. The method of claim 34, further comprising cooling the effluent containing hydrogen in a cooler.

36. The method of claim 32, further comprising passing said effluent containing hydrogen through a scrubber.

37. The method of claim 32, further comprising passing said effluent containing hydrogen through fluidized beds of magnetite.

38. The method of claim 32, further comprising providing a first zone, a second zone and a third zone in said reaction chamber.

39. The method of claim 38, further comprising directing said flow of gas in said reaction chamber from said first zone to said second zone to said third zone.

40. The method of claim 39, further comprising directing movement of the carbon source from the third zone to the second zone to the first zone.

41. A method of producing hydrogen from a carbon source, said method comprising:
(a) producing hydrocarbons and carbon monoxide form said carbon source;
(b) combusting the hydrocarbons and carbon monoxide in a reaction chamber with steam and oxygen to thereby form an effluent containing hydrogen;
(c) separating the hydrogen from the effluent;
(d) providing a first zone, a second zone and a third zone in said reaction chamber;
(e) directing a flow of gas in said reaction chamber from said first zone to said second zone to said third zone; and
(f) circulating aid gas form said third zone to said second zone through a first gas re-circulation line.

42. The method of claim 41, further comprising diverting hydrocarbon vapors from said first gas re-circulation line for producing hydrocarbon products.

43. The method of claim 42, further comprising returning unusable hydrocarbons and carbon monoxide to said reaction chamber through a gas return means.

44. The method of claim 39, further comprising circulating said gas from said second zone to said first zone through a second gas re-circulation line.

45. The method of claim 39, further comprising directing an effluent of hydrogen and carbon monoxide out of said reaction chamber at a location between said second zone and said third zone.

46. The method of claim 45, further comprising adding steam to said effluent of hydrogen and carbon monoxide.

47. The method of claim 32, further comprising preheating said oxygen before combustion in an oxygen pre-heater.

48. The method of claim 32, further comprising preheating said steam in a steam pre-heater before combustion.

49. The method of claim 32, further comprising passing said effluent through a particle separator to remove particles from the effluent.

50. The method of claim 32, further comprising forcing the flow of said effluent gas with at least one blower.

51. The method of claim 36, further comprising supplying a carbon dioxide absorbing solution to the scrubber.

52. The method of claim 51, further comprising circulating said carbon dioxide absorbing solution through said scrubber.

53. The method of claim 33, further comprising converting carbon monoxide to carbon dioxide in said catalytic converter.

54. The method of claim 32, further comprising percolating the gas through multiple fluidized beds of magnetite in a ferrous deoxidizer.

55. The method of claim 54, further comprising diverting an effluent gas from the ferrous deoxidizer to a heat extracting apparatus.

56. The method of claim 55, further comprising producing steam in the heat extracting apparatus.

57. The method of claim 56, further comprising placing the steam produced in the heat extracting apparatus into the ferrous deoxidizer.

58. The method of claim 57, further comprising circulating metallic iron through the ferrous deoxidizer.

59. The method of claim 58, further comprising reacting iron with steam in the ferrous deoxidizer to produce hydrogen.

60. A method of producing hydrogen from a carbon source, said method comprising:
(a) providing a combustion chamber having a first zone, a second zone, and a third zone;
(b) combusting carbon monoxide, oxygen and steam in the first zone of the combustion chamber;
(c) directing a flow of gas from the first zone to the second zone to the third zone;
(d) placing said carbon source in the third zone of the combustion chamber and directing movement of the carbon source from the third zone to the second zone to the first zone;
(e) directing an effluent of hydrogen and carbon monoxide from said combustion chamber;
(f) separating the hydrogen from the carbon monoxide.

61. The method of claim 60, further comprising circulating said gas from said third zone to said second zone through a first gas re-circulation line.

62. The method of claim 61, further comprising diverting hydrocarbon vapors from said first gas re-circulation line for producing hydrocarbon products.

63. The method of claim 62, further comprising returning unusable hydrocarbons and carbon monoxide to said combustion chamber through a gas return means.

64. The method of claim 61, further comprising circulating said gas from said second zone to said first zone through a second gas re-circulation line.

65. The method of claim 60, further comprising directing said effluent of hydrogen and carbon monoxide out of said combustion chamber at a location between said second zone and said third zone.

66. The method of claim 60, further comprising preheating said oxygen in an oxygen pre-heater before combustion.

67. The method of claim 60, further comprising preheating said steam in a steam pre-heater before combustion.

68. The method of claim 60, further comprising controlling the temperature in the first zone to range between approximately 1100 degrees F. to approximately 1800 degrees F.

69. The method of claim 68, further comprising controlling the temperature in the second zone to range between approximately 800 degrees F. to approximately 1100 degrees F.

70. The method of claim 69, further comprising controlling the temperature in the third zone to range between approximately 300 degrees F. to approximately 800 degrees F.

71. The method of claim 60, further comprising directing said effluent of hydrogen and carbon monoxide out of said combustion chamber at a temperature range of between approximately 900 degrees F. and 950 degrees F.

72. A method of producing hydrogen from a carbon source, said method comprising:
(a) providing a combustion chamber having a first zone, a second zone, and a third zone, wherein a temperature of said combustion chamber decreases from said first zone to said second zone to said third zone;
(b) combusting carbon monoxide, oxygen and steam in the first zone of the combustion chamber;
(c) placing said carbon source in the third zone of the combustion chamber and directing movement of the carbon source from the third zone to the second zone to the first zone;
(e) directing an effluent of hydrogen and carbon monoxide out of said combustion chamber at a location between said second zone and said third zone.

73. The method of claim 72, further comprising
(f) separating the hydrogen from the carbon monoxide.

74. A method of producing hydrogen from a carbon source, said method comprising:
(a) providing a combustion chamber having a first zone, a second zone, and a third zone;
(b) combusting carbon monoxide, oxygen and steam in the first zone of the combustion chamber;
(c) placing said carbon source in the third zone of the combustion chamber;
(d) providing temperatures in said first zone ranging between approximately 1100 degrees F. to approximately 1800 degrees F.;
(e) providing temperatures in said second zone ranging between approximately 800 degrees F. to approximately 1100 degrees F.;
(f) providing temperatures in said third zone ranging between approximately 300 degrees F. to approximately 800 degrees F.; and
(g) directing an effluent of hydrogen and carbon monoxide from said combustion chamber.

75. The method of claim 74, further comprising
(h) separating the hydrogen from the carbon monoxide.

76. The method of claim 75, further comprising providing a temperature of said effluent of hydrogen and carbon monoxide at a range of between approximately 900 degrees F. to approximately 950 degrees F.

77. A method of producing hydrogen from a carbon source, said method comprising:
(a) providing a combustion chamber having a first zone, a second zone, and a third zone;
(b) combusting carbon monoxide, oxygen and steam in the first zone of the combustion chamber;
(c) placing said carbon source in the third zone of the combustion chamber;
(d) recirculating a flow of gas from the third zone to the second zone through a first gas re-circulation line;
(e) recirculating a flow of gas from the second zone to the first zone through a second gas re-circulation line; and
(f) directing an effluent of hydrogen and carbon monoxide from said combustion chamber.

78. The method of claim 77, further comprising
(g) separating the hydrogen from the carbon monoxide.

79. The method of claim 77, further comprising diverting hydrocarbon vapors from said first gas re-circulation line for producing hydrocarbon products.

80. The method of claim 79, further comprising returning unusable hydrocarbons and carbon monoxide to said combustion chamber through a gas return means.

81. The method of claim 79, further comprising directing an effluent of hydrogen and carbon monoxide out of said combustion chamber at a location between said second zone and said third zone.

82. A method of producing hydrogen from a carbon source, said method comprising:
(a) producing hydrocarbons and carbon monoxide from said carbon source;
(b) combusting the hydrocarbons and carbon monoxide in a reaction chamber with steam and oxygen to thereby form an effluent of hydrogen and carbon monoxide;
(c) passing the effluent of hydrogen and carbon monoxide through a catalytic converter, without cooling said effluent prior to passing said effluent through said catalytic converter, to convert the carbon monoxide to carbon dioxide; and
(d) separating the carbon dioxide from the hydrogen.

83. The method of claim 82, further comprising cooling the hydrogen and carbon monoxide in a boiler.

84. The method of claim 83, further comprising cooling the hydrogen and carbon monoxide in a cooler.

85. The method of claim 84, further comprising passing said carbon dioxide and said hydrogen through a scrubber.

86. A method of producing hydrogen from a carbon source, said method comprising:
(a) placing said carbon source in a combustion chamber;
(b) combusting carbon monoxide, oxygen, and steam in the combustion chamber with the carbon source to produce an effluent of hydrogen and carbon monoxide;
(c) percolating the effluent of hydrogen and carbon monoxide through fluidized beds of magnetite and reacting iron with steam in a ferrous deoxidizer to produce hydrogen.

87. The method of claim 86, further comprising diverting an effluent gas from the ferrous deoxidizer to a heat extracting apparatus.

88. The method of claim 87, further comprising producing steam in the heat extracting apparatus.

89. The method of claim 88, further comprising placing the steam produced in the heat extracting apparatus into the ferrous deoxidizer.

90. The method of claim 89, further comprising circulating metallic iron through the ferrous deoxidizer.

91. A method of producing hydrogen from oil shale, said method comprising:
(a) producing hydrocarbons and carbon monoxide from said oil shale;
(b) combusting the hydrocarbons and carbon monoxide in a reaction chamber with steam and oxygen to thereby form an effluent containing hydrogen and carbon monoxide; and
(c) separating the hydrogen from the effluent;
wherein the method further comprises providing a first zone, a second zone and a third zone in said reaction chamber;
wherein the method further comprises directing a flow of gas in said reaction chamber from said first zone to said second zone to said third zone;
wherein the method further comprises directing movement of the oil shale from the third zone to the second zone to the first zone;

wherein the method further comprises circulating said gas from said third zone to said second zone through a first gas re-circulation line;

wherein the method further comprises diverting hydrocarbon vapors from said first gas re-circulation line for producing hydrocarbon products;

wherein the method further comprises returning unusable hydrocarbons and carbon monoxide to said reaction chamber through a gas return means;

wherein the method further comprises circulating said gas from said second zone to said first zone through a second gas re-circulation line;

wherein the method further comprises directing said effluent of hydrogen and carbon monoxide out of said reaction chamber at a location between said second zone and said third zone;

wherein the method further comprises preheating said oxygen in an oxygen pre-heater before combustion;

wherein the method further comprises preheating said steam in a steam pre-heater before combustion;

wherein the method further comprises passing the oil shale countercurrent to a flow of gas in the reaction chamber;

wherein the method further comprises passing said effluent through a particle separator to remove particles from the effluent;

wherein the method further comprises forcing the flow of said effluent gas with at least one blower;

wherein the method further comprises controlling the temperature in the first zone to range between approximately 1100 degrees F. to approximately 1800 degrees F.;

wherein the method further comprises controlling the temperature in the second zone to range between approximately 800 degrees F. to approximately 1100 degrees F.;

wherein the method further comprises controlling the temperature in the third zone to range between approximately 300 degrees F. to approximately 800 degrees F.;

wherein the method further comprises directing said effluent of hydrogen and carbon monoxide out of said reaction chamber at a temperature range of between approximately 900 degrees F. and 950 degrees F.

92. A method of producing hydrogen from a carbon source, said method comprising:
    (a) producing hydrocarbons and carbon monoxide form said carbon source;
    (b) combusting the hydrocarbons and carbon monoxide in a reaction chamber with steam and oxygen to thereby form an effluent containing hydrogen;
    (c) separating the hydrogen from the effluent; and
    (d) recirculating the flow of gas in said reaction chamber along a re-circulation path that is external to the reaction chamber and that does not encounter a cooling device.

93. A method of producing hydrogen from a carbon source, said method comprising:
    (a) producing hydrocarbons and carbon monoxide form said carbon source;
    (b) combusting the hydrocarbons and carbon monoxide in a reaction chamber with steam and oxygen to thereby form a first effluent containing hydrogen;
    (c) separating the hydrogen from the first effluent; and
    (d) withdrawing a second gas effluent from said reaction chamber for recirculating into said reaction chamber.

* * * * *